US007617613B2

(12) United States Patent
Merryfield, Jr.

(10) Patent No.: US 7,617,613 B2
(45) Date of Patent: Nov. 17, 2009

(54) ROOF SHINGLE ALIGNMENT SYSTEM

(76) Inventor: Joseph John Merryfield, Jr., 10 Windchime Rd., Egg Harbor Twp., NJ (US) 08234

(*) Notice: Subject to any disclaimer, the term of this patent is extended or adjusted under 35 U.S.C. 154(b) by 385 days.

(21) Appl. No.: 11/788,634

(22) Filed: Apr. 20, 2007

(65) Prior Publication Data

US 2008/0256813 A1 Oct. 23, 2008

(51) Int. Cl.
*G01B 5/25* (2006.01)
*G01D 21/00* (2006.01)

(52) U.S. Cl. .......................................... 33/648; 33/414

(58) Field of Classification Search ................. 33/1 LE, 33/411, 413, 414, 646, 647, 648, 649
See application file for complete search history.

(56) References Cited

U.S. PATENT DOCUMENTS 253,816 A * 2/1882 Clark .......................... 33/648
786,710 A * 4/1905 Anderson .................... 33/648
1,035,062 A * 8/1912 Vromme ...................... 33/648
1,954,213 A * 4/1934 Leonard ...................... 33/648
1,989,141 A * 1/1935 Leonard ...................... 33/648
2,800,719 A * 7/1957 Tuzicka ...................... 33/409
2,889,632 A * 6/1959 Longhi ........................ 33/648
4,860,518 A * 8/1989 Kingham ..................... 52/148
5,197,257 A * 3/1993 Nietling ....................... 33/648
5,918,439 A * 7/1999 Metzer et al. ................. 33/649
6,189,227 B1 * 2/2001 Siegfried ..................... 33/649
6,470,646 B1 * 10/2002 Bryant ........................ 33/648
2007/0266583 A1 * 11/2007 Furrow ........................ 33/648
2009/0133279 A1 * 5/2009 Gorman et al. ............... 33/648

* cited by examiner

*Primary Examiner*—G. Bradley Bennett
(74) *Attorney, Agent, or Firm*—Stuart M. Goldstein

(57) ABSTRACT

A roof shingle alignment system employs three separate types of line bar tools for setting aligned chalklines. The first line bar is used to strike chalklines vertically on roof surfaces and for setting the starter horizontal chalkline. The second line bar is placed on the starter chalkline and is used to strike horizontal chalklines across the roof surface. A third line bar is configured to be placed on the peak of the roof for setting horizontal chalklines near the roof's ridge for cutout and hip cap lines.

20 Claims, 3 Drawing Sheets

ROOF SHINGLE ALIGNMENT SYSTEM

BACKGROUND OF THE INVENTION

An important, initial step in the installation of roofing shingles or tiles, but one which is difficult and time consuming for the roofer, is the proper alignment of the shingles on the roof surface. The shingled roof of a house or like structure is normally readily observable. As a result, shingles which are properly and evenly aligned provide a positive appearance and indicate quality in the overall workmanship of the structure. However, laying shingles remains a manual, labor intensive process. Normally the roofer must first measure, place guidelines and then position and nail each individual shingle to the roof surface before laying the next shingle in sequence. The slant and height of the roof makes alignment and attachment even more difficult. Measurement for guidelines is awkward and may be inaccurate. Placement of chalklines, for instance, requires hand measured marks, whose accuracy may be suspect. Shingles must then be held by hand in the proper aligned position, so they do not slip out of position before attachment.

There have been a number of prior techniques which purport to assist the roofer in the shingle alignment/attachment process; however, none of these result in the ease and efficiency of use and accuracy which is necessary to accomplish properly aligned shingle installation.

SUMMARY OF THE INVENTION

It is thus an object of the present invention to address the limitations and disadvantages of prior roof shingle alignment systems and techniques.

It is an object of the present invention to provide a roof shingle alignment system which allows the roofer to easily, quickly, and accurately set alignment guidelines on roof surfaces.

It is another object of the present invention to provide a roof shingle alignment system which is designed to be used efficiently to save time and material.

It is still another object of the present invention to provide a roof shingle alignment system which uses lightweight and portable tools to set alignment guides.

It is a further object of the present invention to provide a roof shingle alignment system which employs line bar tools specifically configured for placement on roof surfaces to create the required, properly aligned chalklines for positioning shingles.

These and additional objects are accomplished by the present invention, a roof shingle alignment system which comprises three separate types of line bar tools for setting aligned chalklines. The first line bar is used to strike chalklines vertically on roof surfaces and for setting the starter horizontal chalkline on the roof surface. The second line bar is placed on the starter chalkline and is used to strike horizontal chalklines across the roof surface. A third line bar is configured to be placed on the peak of the roof for setting horizontal chalklines near the roof's ridge for cutout and hip cap lines.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figures 2, 3:
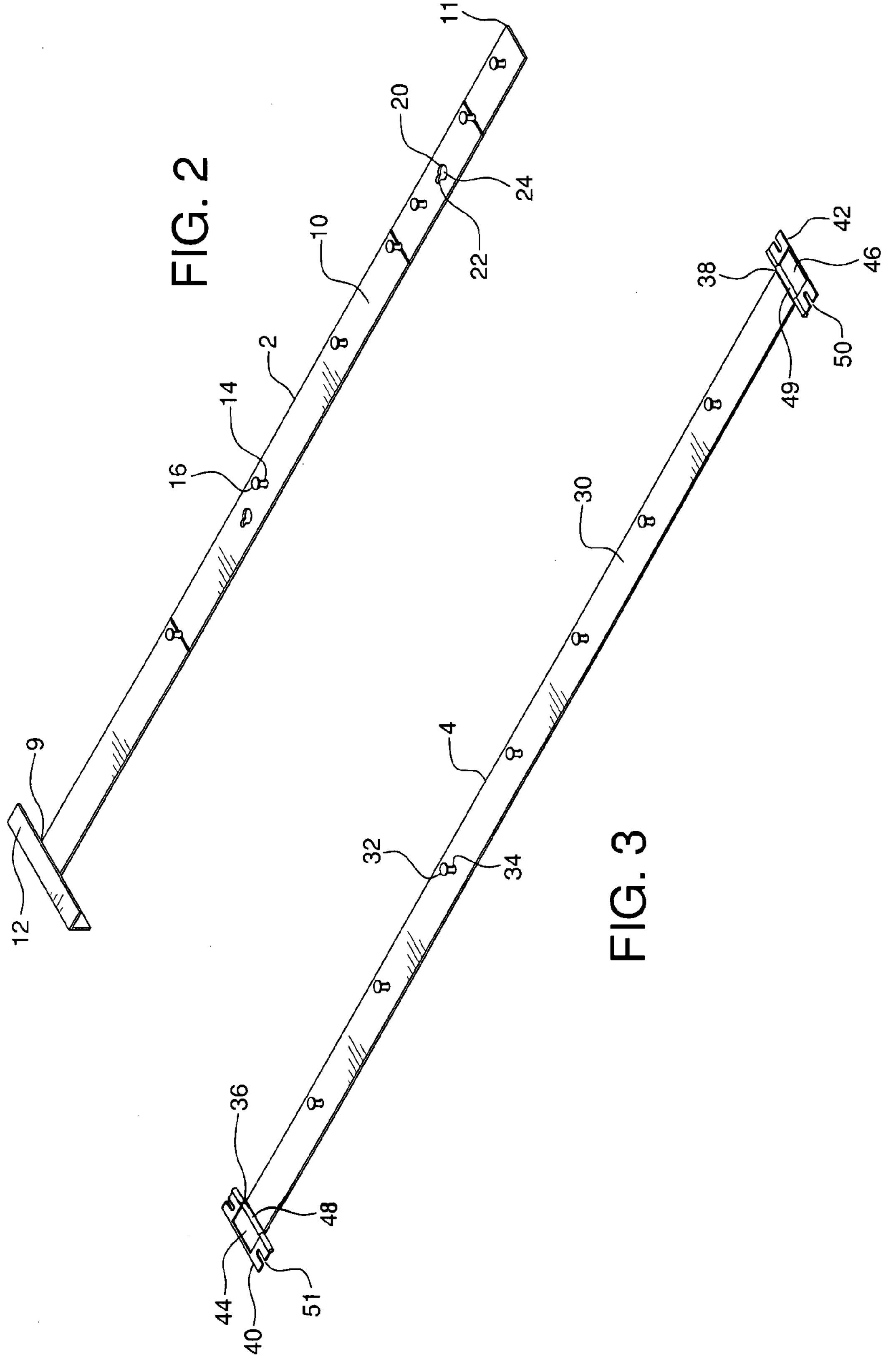
FIG. 2 is an isometric view of one tool of the roof shingle alignment system of the present invention.
FIG. 3 is an isometric view of the second tool of the roof shingle alignment system of the present invention.

The roof shingle alignment system of the present invention comprises two vertical/starter line bars 2, two horizontal line bars 4, and two cap and ridge line bar 6. One of each of these tools is shown in detail in FIGS. 2-4. Bar 2 comprises elongated bar section 10 and angle bar section 12 secured perpendicularly to bar section 10 at its end 9. It is anticipated that bar section 10 will be approximately 38 inches long by 1½ inches wide. However, the invention is not to be considered restricted to these dimensions. Bar section 10 can be designed in any convenient size, including metric dimensions, based on need and usage.

Figure 5:
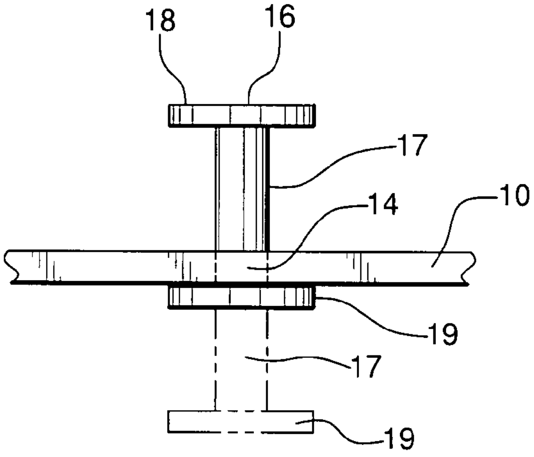
FIG. 5 is a side view showing movement of the adjustable pins of the roof shingle alignment system of the present invention.

Bar section 10 comprises a plurality of through openings 14 in which chalkline pins 16, with mid-sections 17, upper caps 18 and lower caps 19, as best seen in FIG. 5, are positioned. Chalkline pins 16 are sized to slide up and down within openings 14 of bar 2. When bar 2 is placed on a roof surface, pins 16 are pushed upward, with their respective upper caps 18 raised above the top surface of the bar and their lower caps 19 being flush against the bottom surface of the bar. Pins 16 are spaced in accordance with the appropriate, recognized measured distances of standard shingles. But again, the invention is not to be considered limited to this spacing between pins 16. Pins 16 may be positioned for any shingle or tile laying configuration or distance as may be needed.

Bar section 10 also comprises at least two nail slots 20. Slots 20 have small section 22 and larger section 24. Section 22 is configured to accept a headed nail hammered into a roof surface to secure bar 2. Section 24 has a larger diameter than the diameter of the head of the nail to be used. To detach bar 2 from the roof surface, end 11 of the bar is tapped. This shifts bar 2 and its slots 20 laterally. The nail, once positioned within section 22, is now within section 24. Since the head of the nail is smaller than section 24, bar 2 is no longer secured and can be lifted off the roof surface.

Bar 4 comprises elongated bar section 30. It is anticipated that bar section 30 will be approximately 42 inches long by 1½ inches wide. However, once again the invention is not to be considered restricted to these dimensions. Bar section 10 can be designed in any convenient size, including metric dimensions, based on need and usage.

Bar section 10 comprises a plurality of spaced chalkline pins 32 within openings 34. Pins 32 slide up and down within openings 34 in the same manner as has previously been described with respect to pins 16. Also as has been described with respect to pins 16, the spacing between pins 32 is not to be considered as limiting the scope of the invention. Bar 4 can be sized with any standard shingle spacing measurement or other desired spacing.

Connected at ends 36 and 38 of bar 4 are bifold hinges 40 and 42, respectively. Hinges 40 and 42 comprise main body sections 44 and 46 which rotate about ends 36 and 38 at hinge sections 48 and 49. Nail slots 50 in main body sections 44 and 46 are provided to secure bar 4 on a roof surface and, like slots 20 described with regard to bar 2, are configured to accept hammered headed nails. With a tap on the sides of main body sections 44 and 46, bar 4 is released from its nailed attachment to the roof surface.

Bar 6 comprises lateral bar sections 60 and 62 interconnected by center hinge 64, which permits the bar sections to go from a flat to an angled configuration for placement over the peak of a roof. It is anticipated that lateral bar sections 60 and 62 will each be approximately 7 inches long and 1½ inches wide. The invention is not to be considered restricted to the size of bar 6, as previously described with respect to bars 2 and 4.

Bar 6 comprises chalkline pins 66, 67, and 68 which slide up and down within their respective openings in the same manner as has previously been described with respect to pins 16 and 32. End pins 66 are to be spaced 6 inches from center hinge 64, so as to provide hip cap guidelines. Pins 67 are to be spaced 1 inch and pins 68 are to be spaced 1¾ inch so as to provide ridge vent cutout guidelines. Nail slots 70, like slots 20 previously described, are provided in bar sections 60 and 62.

Figure 1:
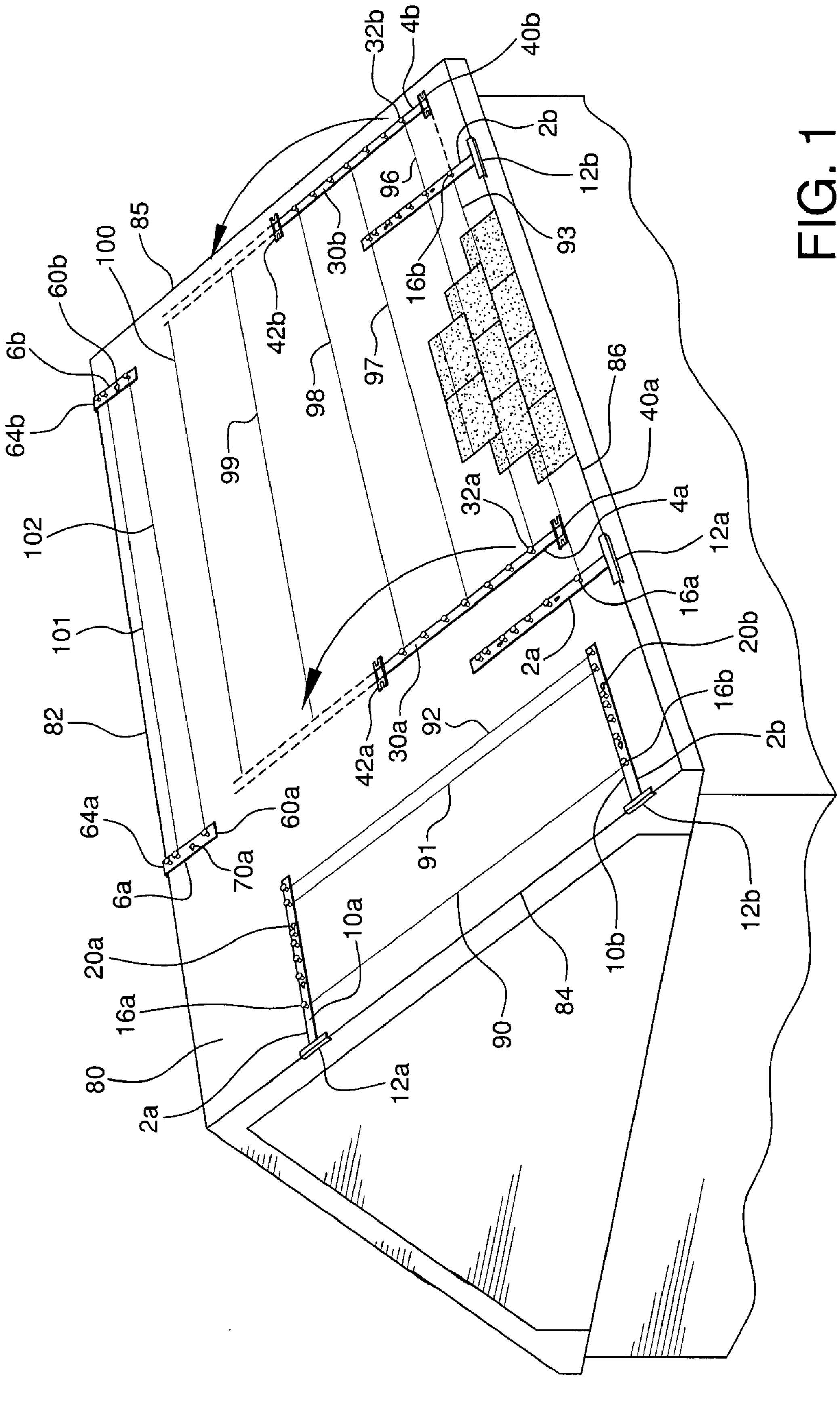
FIG. 1 is a view of the roof shingle alignment system of the present invention, showing representative placement on a roof surface.

The roof shingle alignment system of the present invention is used as follows to properly, quickly, and efficiently align shingles. As seen in FIG. 1, one vertical/starter line bar 2*a* is placed on roof 80 near roof peak 82, such that its angle bar section 12*a* is mounted over roof edge 84. Chalkline pins 16*a* are compelled upward and extend from the top surface of bar section 10*a*. Bar 2*a* is then nailed to roof 80 through nail slots 20*a*. Bar section 10*a* is thus positioned perpendicular to edge 84 and parallel to roof peak 82. A second vertical/starter line bar 2*b* is placed on roof 80 nearer its bottom edge 86, such that its angle bar section 12*b* is mounted over roof edge 84. Chalkline pins 16*b* are compelled upward from the top surface of bar section 10*b*. Bar 2*b* is also nailed to roof 80 through nail slots 20*b*. Bar section 10*b* thus is also positioned perpendicular to roof edge and it is parallel to bar section 10*a*. Chalkline 90 is then extended and tied or otherwise attached between upstanding chalk pins 16*a* and 16*b* at the appropriate vertically pre-measured, shingle spaced distances. Parallel chalklines, for instance 91 and 92, are similarly positioned and secured between chalkline pins located within bars 2*a* and 2*b*. Chalklines 90-92 are then snapped, producing vertical chalk guidelines on roof 80, allowing for the accurate vertical alignment of shingles.

The accurate layout of horizontal chalk guidelines is accomplished by placing bars 2*a* and 2*b* parallel to each other in spaced relation on roof bottom edge 86, such that their respective angle bar sections 12*a* and 12*b* are hooked over the edge, as shown in FIG. 1. Chalkline 93 is then extended between bars 2*a* and 2*b* and attached at chalkline pins 16*a* and 16*b*. Chalkline 93 is snapped to produce starter horizontal guideline at 93. For illustrative purposes only, bar 2*b* is shown a distance inboard of roof edge 85. In use, bar 2*b* would be positioned closer to edge 85, such that guideline 93 extends substantially to the end of roof 80.

Figure 4:
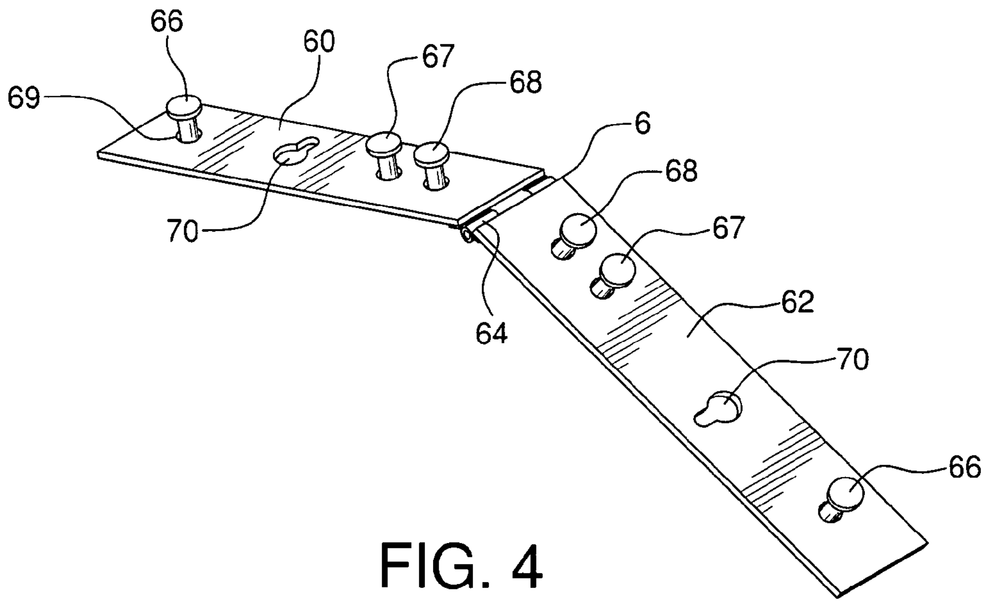
FIG. 4 is an isometric view of the third tool of the roof shingle alignment system of the present invention.

As seen in FIG. 4, one horizontal line bar 4*a* is then positioned such that its bifold hinge 40*a* is on guideline 92. Chalkline pins 32*a* are compelled upward and extend from the top surface of bar section 30*a*. Bifold hinges 40*a* and 42*a* are nailed to roof 80, through their nail slots. Another horizontal line bar 4*b* is positioned on guideline 93 closer to roof edge 85, in spaced relation to bar 4*a*, such that its bifold hinge 40*b* is on guideline 93. Chalkline pins 32*b* are pushed upward and extend from the top surface of bar 4*b*. Bifold hinges 40*b* and 42*b* are also nailed to roof 80 through their nail slots. Chalkline 96 is then extended and tied or otherwise attached between upstanding chalkline pins 32*a* and 32*b* at the appropriate horizontally, pre-measured shingle spaced distance. Parallel chalklines, for instance 97 and 98, are similarly positioned and secured between chalkline pins located within bars 4*a* and 4*b*. Chalklines 96-98 are then snapped, producing horizontal chalk guidelines on roof 80, allowing for the accurate horizontal alignment of shingles at the lower section of the roof.

After the initial set of horizontal chalk guidelines are struck between bars 4*a* and 4*b*, hinges 40*a* and 40*b* are removed from their nail attachments and bar sections 30*a* and 30*b* are rotated around nailed bifold hinges 42*a* and 42*b*, until they come to rest on roof 80, above these hinges. Since chalkline pins 32*a* and 32*b* are slideably moveable up and down within their respective openings in bar sections 30*a* and 30*b*, they are now pushed up and extend outwardly from the new top surfaces of the bar sections. New chalklines 99 and 100 are next secured between chalkline pins 32*a* and 32*b* and laddered chalk alignment lines are created as previously described. It is evident that this process of creating horizontal guidelines for proper horizontal shingle alignment by positioning bars 4*a* and 4*b* and rotating their bar sections 30*a* and 30*b* about bifold hinges 40*a*, 42*a*, 40*b* and 42*b*, continues for the entire width of roof 80.

Bar 6 is used for creating properly aligned hip cap lines and ridge cut out lines. One bar 6*a* is placed over roof peak 82 of roof 80 such that its center hinge 64*a* is over the peak and its lateral bar sections, one of which 60*a*, is shown in FIG. 4, straddle the upper regions of the roof. Bar 6*a* is nailed to roof 80 through its nail slots. Second bar 6*b* is similarly placed closer to edge 85 of roof 80, in spaced relation to bar 6*a*, with its center hinge 64*b* over roof peak 82 and its lateral bar sections, one of which, 60*b*, is shown in FIG. 4, straddling the upper regions of the roof. Horizontal chalklines 97 and 99 are extended between the chalkline pins of bars 6*a* and 6*b* and chalklines are created as previously described, this time denoting hip cap and ridge cut out lines.

Coordinated use of bar members 2, 4, and 6, making up the roof shingle alignment system of the present invention, results in the roofer being able to quickly and accurately create a comprehensive series of chalkline guides prior to beginning the actual shingle roofing installation. This saves an inordinate amount of time, ensures for precision in installation, produces less material waste, and enhances the overall appearance of the job.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A roof shingle alignment system, said system comprising:

first shingle positioning means for horizontally and vertically aligning shingles on a roof, said first positioning means being configured to be placed at an edge of a roof and comprising first attachment means for the connection of a plurality of chalklines;

second shingle positioning means for horizontally and vertically aligning shingles on a roof, said second positioning means being configured to be placed at an edge of the roof and comprising second attachment means for the connection of a plurality of chalklines; and a plurality of chalklines extending between and connected to the first and second attachment means.

2. The roof shingle alignment system as in claim 1 wherein the first attachment means and the second attachment means each comprises a plurality of moveable attachment members.

3. The roof shingle alignment system as in claim 1 wherein the first and second shingle positioning means each comprises a roof edge mounting section.

4. The roof shingle alignment system as in claim 1 wherein the first and second shingle positioning means are configured to be positioned parallel to each other on the roof.

5. The roof shingle alignment system as in claim 1 wherein the first and second shingle positioning means each comprise elongated bar members.

6. The roof shingle alignment system as in claim 5 wherein the first and second attachment means comprise adjustable pins located on the bar members.

7. The roof shingle alignment system as in claim 1 further comprising third shingle positioning means for horizontally aligning shingles on a roof, said third shingle positioning means comprising ends with hinge means for rotating the third positioning means about said ends and third attachment means for the connection of a plurality of chalklines.

8. The roof shingle alignment system as in claim 7 further comprising fourth shingle positioning means for horizontally aligning shingles on a roof, said fourth shingle positioning means comprising ends with hinge means for rotating the fourth positioning means about said ends and fourth attachment means for the connection of a plurality of chalklines.

9. The roof shingle alignment system as in claim 8 wherein the third and fourth shingle positioning means each comprise elongated bar members.

10. The roof shingle alignment system as in claim 8 further comprising a plurality of chalklines extending between the third and fourth attachment means.

11. The roof shingle alignment system as in claim 8 wherein the third attachment means and the fourth attachment means each comprises a plurality of moveable members.

12. The roof shingle alignment system as in claim 8 wherein said third and fourth shingle positioning means are configured to be positioned parallel to each other on the roof.

13. The roof shingle alignment system as in claim 8 further comprising first measuring means configured to be placed on the peak of the roof for horizontally aligning roof ridge components, said measuring means comprising dual hinged sections and attachment means for the connection of a plurality of chalklines;

second measuring means configured to be placed on the peak of the roof for horizontally aligning ridge components, said second measuring means comprising dual hinged sections and second attachment means for the connection of a plurality of chalklines; and a plurality of chalklines extending between and connected to the attachment means of the first and second measuring means.

14. The roof shingle alignment system as in claim 13 wherein the attachment means of the first and second measuring means comprises a plurality of moveable attachment devices.

15. The roof shingle alignment system as in claim 13 wherein the first and second measuring means are configured to be positioned parallel to each other on the ridge of the roof.

16. A roof shingle alignment system, said system comprising:

first and second shingle positioning means for vertically and horizontally aligning shingles on a roof, said first and second shingle positioning means each comprising attachment means for the connection of chalklines;

third and fourth shingle positioning means for horizontally aligning shingles on the roof, said third and fourth shingle positioning means each comprising hinged means for rotating the third and fourth positioning means and attachment means for the connection of chalklines; and at least one chalkline extending between and connected to the attachment means of the first and second shingle positioning means and at least one chalkline extending between and connected to the attachment means of the third and fourth shingle positioning means.

17. The roof shingle alignment system as in claim 16 further comprising first and second measuring means configured to be placed on the peak of the roof for horizontally aligning roof ridge components, each said measuring means comprising dual hinged sections and attachment means for the connection of chalklines, and at least one chalkline extending between and connected to the first and second measuring means.

18. The roof shingle alignment system as in claim 17 wherein the shingle positioning means and the measuring means comprise elongated bar members.

19. A roof alignment component for aligning components at the peak of a roof, said device comprising:

a first measuring means configured to be placed on the peak of a roof for horizontally aligning roof ridge components, said measuring means comprising dual hinged sections joined by a hinge, such that the hinge members rotate about the hinge and attachment means for the connection of chalklines; and second measuring means configured to be placed on the peak of a roof for horizontally aligning roof ridge components, said second measuring means comprising dual hinged sections joined by a hinge, such that the hinge members rotate about the hinge and second attachment means for the connection of chalklines.

20. The roof alignment component as in claim 19 wherein the hinge sections of both the first and second measuring means comprise elongated bar members.

* * * * *